UNITED STATES PATENT OFFICE.

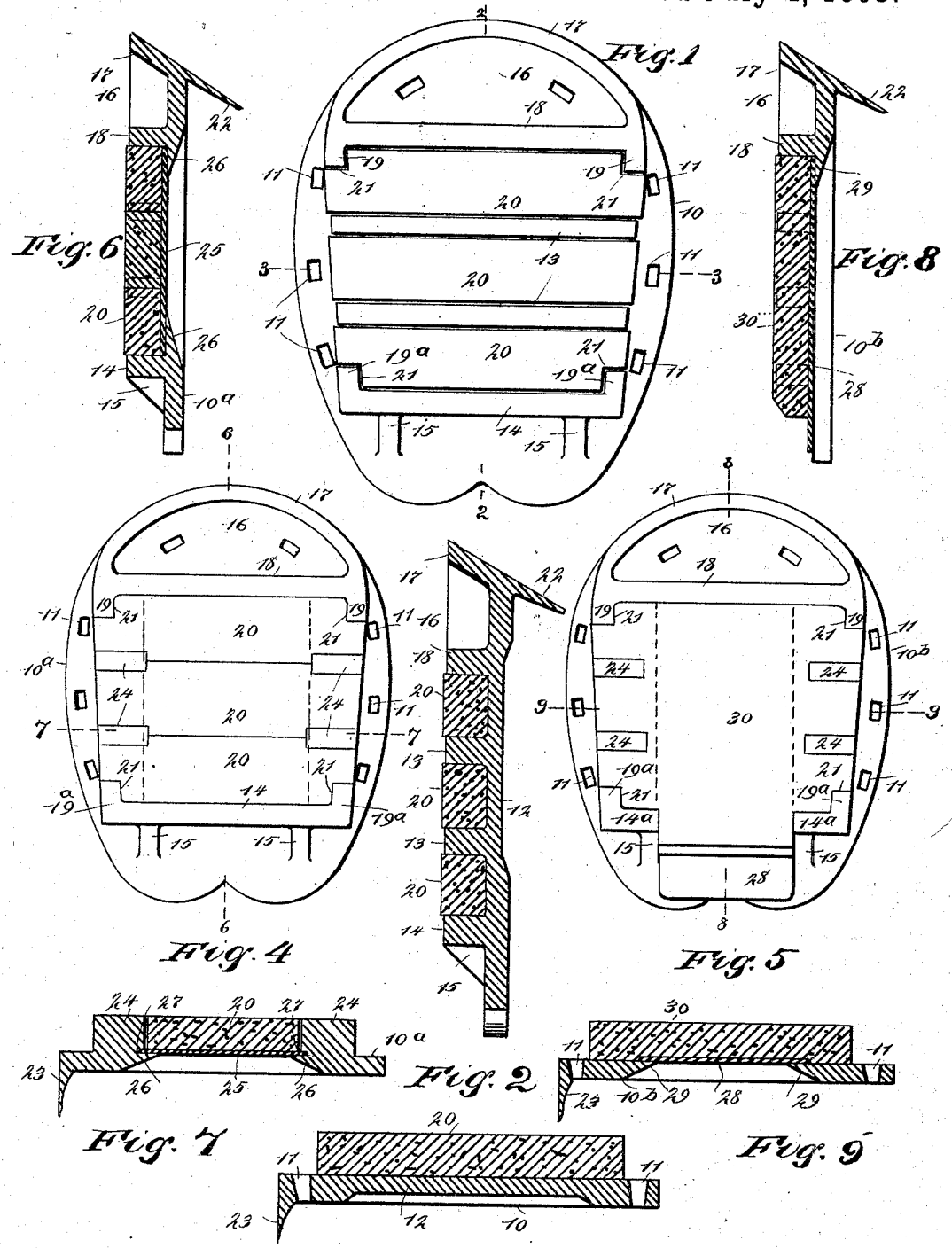

DAVID GINGOLD, OF NEW YORK, N. Y.

HORSESHOE.

SPECIFICATION forming part of Letters Patent No. 500,881, dated July 4, 1893.

Application filed February 17, 1893. Serial No. 462,708. (No model.)

*To all whom it may concern:*

Be it known that I, DAVID GINGOLD, of New York city, in the county and State of New York, have invented a new and Improved Horseshoe, of which the following is a full, clear, and exact description.

My invention relates to improvements in horseshoes, and the object of my invention is to produce a shoe which is perfectly balanced, which is constructed in such a way as to prevent the horse wearing it from slipping, which has a sole to guard the hoof and prevent any articles from pricking the hoof, which is padded in a way to prevent the picking up of stones, snowballs and other things, which has a sharp toe shaped like the toe of the hoof and adapted to prevent slipping when either backing or starting, and also from its shape adapted to prevent stumbling, which prevents corns by providing a natural bearing for the frog, and which, owing to its construction and its even bearing on the ground, may be held to the hoof by very light nails.

To these ends, my invention consists in a horseshoe, the construction of which will be hereinafter described and claimed.

Reference is to be had to the accompanying drawings forming a part of this specification, in which similar figures of reference indicate corresponding parts in all the views.

Figure 1 is an inverted plan view of the horseshoe embodying my invention. Fig. 2 is a longitudinal section on the line 2—2 in Fig. 1. Fig. 3 is a cross section on the line 3—3 in Fig. 1. Fig. 4 is an inverted plan view of a modified form of the shoe. Fig. 5 is an inverted plan of another modification of the shoe. Fig. 6 is a longitudinal section on the line 6—6 in Fig. 4. Fig. 7 is a cross section on the line 7—7 in Fig. 4. Fig. 8 is a longitudinal section on the line 8—8 in Fig. 5; and Fig. 9 is a cross section on the line 9—9 in Fig. 5.

The horseshoe 10 is of the usual shape on top, and is provided with the customary nail holes 11, which enable it to be nailed to the hoof. The shoe is provided with a central sole 12, which is thinned as shown in Fig. 2, and which covers the hoof bottom so as to act as a guard and prevent the hoof from being pricked. Extending transversely across the shoe on the under side, are ribs 13 of rectangular cross section, which serve in a measure as calks, as hereinafter described, and a heel piece 14 extends parallel with the ribs and is of the same general shape, this heel piece being strengthened by braces 15 extending diagonally from the back of the heel piece to the heel of the shoe.

The shoe has on its under side a toe-piece 16, which is shaped like the toe of the hoof, being of a semi-elliptical shape and having a forwardly-extending portion 17, and a transverse portion 18 which lies parallel with the ribs 13. The toe-piece has rearwardly-extending flanges 19, and the heel-piece has forwardly-extending flanges 19ª, these serving to prevent the displacement of the filling 20 adjacent to said parts. The space between the ribs 13 and between the ribs and the toe and heel-pieces is filled by a suitable material 20, which is preferably of cork, but may be of rubber, leather, or other suitable material which is somewhat yielding and has good frictional qualities, and this material or filling projects slightly below the bottom edges of the toe-piece, the heel-piece and the cross ribs, and is cut away at 21 so as to fit around the flanges 19 and 19ª. This material causes the horse's foot to strike yieldingly when the horse is in motion, and it also prevents the horse from slipping. If, however, it becomes worn down, the ribs, the heel-piece and the toe piece serve as calks and prevent slipping.

The peculiar form of the toe-piece causes it to extend forward like the toe of the hoof, so that the horse is not so likely to stumble as where the calks extend straight down; moreover, the parts 17 and 18 of the toe-piece have a double action and enable the horse to get a good grip on the ground when either starting or backing. The shoe is provided with the usual toe and side pieces 22 and 23, which overlap the toe and side of the hoof, the side piece or clip 23 being preferably on one side only, in the usual way.

In Figs. 4, 6 and 7, is shown a slight modification of the shoe, the form here shown being a bar shoe 10ª, having the nail holes 11 as described, and having also the toe-piece 16 and heel piece 14 both as specified. The bar shoe is provided on the under side and near opposite edges with transverse ribs 24, which extend only partly across the shoe and are substituted for the ribs 13, and the filling 20 is arranged substantially as in the shoe shown in Fig. 1, except that the strips of filling meet at the edges and are cut away to fit around the ribs 24. The central portion of the bar shoe 10ª has a detachable sole or guard plate 25, made of sheet metal, and resting against a ledge 26, extending around the inner portion of the shoe, the sole being sprung into notches 27 on the upper sides of the ribs 24, as shown in Fig. 4. This form of shoe may be adjusted to fit hoofs of different sizes, as its open central portion permits it to be sprung so as to either widen or lengthen it as may be necessary.

Figs. 5, 8 and 9 illustrate an open shoe embodying my invention, this shoe 10ᵇ being substantially like the bar shoe with the exception that it is open at the heel, and it is provided with a detachable sole or plate 28, resting on a ledge 29, extending around the shoe, and the filling in this case is made of a solid or single piece 30 of cork or other material which fits snugly against the guard plate or sole, and is cut away to fit around and against the ribs 24 and the toe and heel pieces.

In the open form of shoe described it is obvious that the heel piece 14 cannot extend entirely across, and so short heel pieces 14ª are arranged on opposite sides of the shoe, these being braced in the manner already described and having forwardly-extending flanges 19ª as specified.

The shoe is attached to a hoof in the ordinary way by means of nails which are driven through the holes 11 and through the hoof. The yielding material is held between the several ribs and between the toe and heel pieces of a shoe, and if forced firmly into place will stick without cement, but if desired, any suitable cement may be used for fastening it more firmly in place.

Having thus described my invention, I claim as new and desire to secure by Letters Patent—

1. As an improved article of manufacture, a horseshoe, having a central sole or guard plate, a semi-elliptical toe piece, a transverse heel piece, and transverse ribs between the toe and heel piece, substantially as specified.

2. As an improved article of manufacture, a horseshoe, having a central sole or guard plate, a toe-piece with a curved front portion and a straight back portion, a transverse heel piece, a plurality of cross ribs arranged between the toe and heel pieces, and filling material held between the ribs and between the ribs and the toe and heel pieces, substantially as specified.

3. As an improved article of manufacture, a horseshoe, having a detachable central sole or guard plate, a semi-elliptical toe piece, a transverse heel piece, cross ribs between the toe and heel pieces, and filling material held between the ribs and between the ribs and the toe and heel pieces, substantially as specified.

4. The combination, with a horseshoe having an open central portion with a ledge extending around said central portion, of the cross ribs arranged on the under side of the shoe, and the detachable guard plate adapted to rest against the ledges and in notches at the top of the cross ribs, substantially as specified.

DAVID GINGOLD.

Witnesses:
HERIS BILTCHIN,
MORRIS GROSSWEINER.